(12) United States Patent
Wong et al.

(10) Patent No.: US 10,492,083 B2
(45) Date of Patent: Nov. 26, 2019

(54) METHOD AND APPARATUS FOR DETERMINING DELAY BETWEEN RANDOM ACCESS CHANNEL AND DOWNLINK CONTROL CHANNEL

(71) Applicant: Alcatel Lucent, Boulogne Billancourt (FR)

(72) Inventors: Shin Horng Wong, Chippenham (GB); Sigen Ye, New Providence, NJ (US); Yu Chen, Shanghai (CN); Matthew Baker, Canterbury (GB)

(73) Assignee: Alcatel Lucent, Nozay (FR)

( * ) Notice: Subject to any disclaimer, the term of this patent is extended or adjusted under 35 U.S.C. 154(b) by 117 days.

(21) Appl. No.: 15/024,437

(22) PCT Filed: Oct. 30, 2013

(86) PCT No.: PCT/CN2013/086249
§ 371 (c)(1),
(2) Date: Mar. 24, 2016

(87) PCT Pub. No.: WO2015/043040
PCT Pub. Date: Apr. 2, 2015

(65) Prior Publication Data
US 2016/0234700 A1 Aug. 11, 2016

(30) Foreign Application Priority Data

Sep. 27, 2013 (WO) ................ PCT/CN2013/084425

(51) Int. Cl.
*H04W 74/08* (2009.01)
*H04W 24/02* (2009.01)
(Continued)

(52) U.S. Cl.
CPC ............ *H04W 24/02* (2013.01); *H04L 5/0053* (2013.01); *H04L 5/0094* (2013.01); *H04W 48/12* (2013.01);
(Continued)

(58) Field of Classification Search
CPC ............. H04W 24/02; H04W 74/0833; H04W 72/042; H04W 72/085; H04W 76/046;
(Continued)

(56) References Cited

U.S. PATENT DOCUMENTS 7,398,108 B2   7/2008   Hondo
8,280,421 B2 * 10/2012   Nanri .................... H04L 1/0001
                                                             455/458

(Continued)

FOREIGN PATENT DOCUMENTS

CN           1533055 A      9/2004
CN         101911543 A     12/2010
(Continued)

OTHER PUBLICATIONS

Intel Corporation, "Discussion on PRACH Coverage Enhancement for Low Cost MTC", R1-132930, 3GPP TSG RAN WG1 Meeting #74, Barcelona, Spain, Aug. 19-23, 2013; hereinafter "Intel Corp, R1-132930".*

(Continued)

*Primary Examiner* — Lan-Huong Truong
(74) *Attorney, Agent, or Firm* — Fay Sharpe LLP

(57) ABSTRACT

A method is provided for determining delay between random access channel and downlink control channel in random access procedures. The method comprises receiving from a base station, by a user equipment, information related to one or more delay(s) between a random access channel and one or more repetition period(s) of a downlink control channel for the user equipment; sending to the base station, (Continued)

by the user equipment, the random access channel transmitted in a repetitive form; receiving, by the user equipment, the one or more repetition period(s) of the downlink control channel, wherein each of the one or more repetition period(s) of the downlink control channel is transmitted according to a corresponding one of the delay(s); and determining, by the user equipment, the one or more delay(s) based at least on the information related to the delay(s).

20 Claims, 3 Drawing Sheets

(51) Int. Cl.
H04W 76/27 (2018.01)
H04L 5/00 (2006.01)
H04W 48/12 (2009.01)
H04W 72/04 (2009.01)
H04W 72/08 (2009.01)
H04W 88/02 (2009.01)
H04W 88/08 (2009.01)

(52) U.S. Cl.
CPC ..... *H04W 72/042* (2013.01); *H04W 72/0446* (2013.01); *H04W 72/085* (2013.01); *H04W 74/0833* (2013.01); *H04W 76/27* (2018.02); *H04W 88/02* (2013.01); *H04W 88/08* (2013.01)

(58) Field of Classification Search
CPC .......................... H04W 72/0446; H04W 48/12; H04W 88/08; H04W 88/02; H04L 5/0053; H04L 5/0094
See application file for complete search history.

(56) References Cited

U.S. PATENT DOCUMENTS

| 8,515,480 | B2 | 8/2013 | Kuroda | |
|---|---|---|---|---|
| 8,630,653 | B2 | 1/2014 | Ahn et al. | |
| 8,923,274 | B2* | 12/2014 | Wang | H04L 1/08 370/351 |
| 2010/0272004 | A1* | 10/2010 | Maeda | H04L 5/0007 370/312 |
| 2011/0222492 | A1* | 9/2011 | Borsella | H04W 74/002 370/329 |
| 2015/0016312 | A1* | 1/2015 | Li | H04W 74/0833 370/280 |
| 2016/0234810 | A1 | 8/2016 | Wong et al. | |

FOREIGN PATENT DOCUMENTS

| CN | 102802127 A | 11/2012 |
|---|---|---|
| WO | WO 2007/052753 A1 | 5/2007 |

OTHER PUBLICATIONS

International Search Report for PCT/CN2013/086249 dated May 28, 2014.
Intel Corporation, "Discussion on PRACH Coverage Enhancement for Low Cost MTC", R1-132930, 3GPP TSG RAN WG1 Meeting #74, Barcelona, Spain, Aug. 19-23, 2013.
Huawei, et al., "Further discussion on PRACH coverage improvement for Low-Cost MTC UEs", R1-132881, 3GPP TSG RAN WG1 Meeting #74, Barcelona, Spain, Aug. 19-23, 2013.
Alcatel-Lucent et al., "(E)PDCCH coverage extension for MTC devices," 3$^{rd}$ Generation Partnership Project (3GPP), 3GPP TSG-RAN WG1 Meeting #72bis, R1-130941, 4 pages, Chicago, USA, Apr. 15-19, 2013.
Alcatel-Lucent et al., "Coverage enhancement for (E)PDCCH," 3$^{rd}$ Generation Partnership Project (3GPP), 3GPP TSG-RAN WG1 Meeting #74, R1-134209, 2 pages, Guangzhou, China, Oct. 7-11, 2013.

* cited by examiner

… (1)

METHOD AND APPARATUS FOR DETERMINING DELAY BETWEEN RANDOM ACCESS CHANNEL AND DOWNLINK CONTROL CHANNEL

FIELD OF THE INVENTION

The present application generally relates to communication technology, and more particularly relates to determining delay between random access channel and physical downlink control channel.

BACKGROUND OF THE INVENTION

Machine Type Communication (MTC) is a work item being studied in 3GPP ($3^{rd}$ Generation Partnership Project), targeting cellular based Machine to Machine communication (M2M). The machine devices may be located in the basement with higher penetration loss than the current cell edge UEs. To support these devices, coverage enhancement techniques are needed.

One of the techniques to enhance the coverage is repetition. At the receiver side, the repetitive control information packets are combined and decoded for better performance. It is spectrally efficient to have various levels of repetition for UE located under various radio conditions.

Random access procedure includes four types of message exchange: preamble transmission in uplink, random access response (RAR) transmission in downlink, message 3 (e.g. RRC connection request) in uplink, and contention resolution message in downlink. Each of these messages may require numerous repetitions.

In current communication systems, eNB defines a RAR time window during which UE performs blind decoding in order to obtain the RAR message. Also, in current communication systems, physical downlink control channel (PDCCH) and RAR messages for the same UE are transmitted in the same sub-frames.

SUMMARY OF THE INVENTION

As described above, blind decoding may consume much time and system resource, and may generate great operation complexity. Also, transmitting PDCCH and RAR messages in the same sub-frames may require UEs to buffer the entire system bandwidth to accumulate repetition energy in order to decode the RAR messages after it has received all the PDCCH repetitions.

In order to solve the above stated problems, the present application provides the following methods and apparatus to simplify the random access procedure by determining the delay between random access channel and downlink control channel.

One embodiment of the present application provides a method comprising determining, by a base station, one or more delay(s) between a random access channel and one or more repetition periods of a downlink control channel for a user equipment, depending at least on a repetition level of the random access channel and/or a repetition level of the downlink control channel; sending to the user equipment, by the base station, information related to one or more delay(s); receiving from the user equipment, by the base station, the random access channel transmitted in a repetitive form; and sending to the user equipment, by the base station, the one or more repetition period(s) of the downlink control channel, wherein each of the one or more repetition period(s) is transmitted according to a corresponding one of the delay(s) in a repetitive form.

Specifically, the information related to the delay(s) comprises duration of the delay(s) determined as a function of the repetition level of the random access channel, or duration of a first one of the delay(s) between the random access channel and a first one of the repetition period(s) of the downlink control channel together with duration of one or more gap(s) between the one or more repetition period(s) of the downlink control channel, and a total number of the one or more repetition period(s) of the downlink control channel for the user equipment.

Specifically, the information related to the delay(s) at least comprises one or more sub-frame number(s) of one or more sub-frame(s) starting the one or more repetition period(s) of the downlink control channel, and one or more offset values related to the sub-frame number(s), and the repetition level of the downlink control channel; or the information related to the delay(s) at least comprises a first sub-frame number of a sub-frame starting the first repetition period of the downlink control channel, offsets related to the first sub-frame number, and the duration of the one or more gap(s) between the repetition period(s) of the downlink control channel; and the information related to the delay(s) also comprises a total number of the one or more repetition period(s) of the downlink control channel for the user equipment.

Specifically, the information related to the delay(s) further comprises duration of a pre-determined portion of the first one of the delay(s) and instructions to the user equipment to initiate determining of a start of the first repetition period of the downlink control channel at an end of the pre-determined portion of the first one of the delay(s).

Specifically, the information related to one or more delay(s) is sent in broadcast or other dedicated signaling transmission prior to said sending of the random access channel.

The above method comprises after said sending of the one or more repetition period(s) of the downlink control channel, sending to the user equipment, by the base station, downlink shared channel.

Specifically, the random access channel carries preamble messages, and the downlink shared channel carries random access response messages or contention resolution messages.

One embodiment of the present application provides a base station configured to perform any of the methods described above.

Another embodiment of the present application provides a method comprising receiving from a base station, by a user equipment, information related to one or more delay(s) between a random access channel and one or more repetition period(s) of a downlink control channel for the user equipment; sending to the base station, by the user equipment, the random access channel transmitted in a repetitive form; receiving, by the user equipment, the one or more repetition period(s) of the downlink control channel, wherein each of the one or more repetition period(s) of the downlink control channel is transmitted according to a corresponding one of the delay(s); and determining, by the user equipment, the one or more delay(s) based at least on the information related to the delay(s).

Specifically, the information related to the delay(s) comprises duration of the delay(s) determined as a function of the repetition level of the random access channel, or duration of a first one of the delay(s) between the random access channel and a first one of the repetition period(s) of the downlink control channel as well as duration of one or more gap(s) between the repetition period(s) of the downlink control channel, and a total number of the one or more repetition period(s) of the downlink control channel for the user equipment.

Specifically, the information related to the delay(s) at least comprises one or more sub-frame number(s) of one or more sub-frame(s) starting the one or more repetition period(s) of the downlink control channel, and one or more offset values related to the sub-frame number(s), and the repetition level of the downlink control channel; or the information related to the delay(s) at least comprises a first sub-frame number of a sub-frame starting the first repetition period of the downlink control channel, offsets related to the first sub-frame number, and the duration of the one or more gap(s) between the repetition period(s) of the downlink control channel; and the information related to the delay(s) also comprises a total number of the one or more repetition period(s) of the downlink control channel for the user equipment.

Specifically, one or more start(s) of the one or more repetition period(s) of the downlink control channel are determined using $(10*SFN_i+n_i+k_{1i})$ MOD $(R+k_{2i})=0$; wherein $SFN_i$ represents a system frame number of an ith one of the repetition period(s), and $n_i$ represents a sub-frame number of a starting sub-frame of the ith repetition period, R represents the repetition level of the downlink control channel, $k_{1i}$ and $k_{2i}$ represent offset values related to the sub-frame number $n_i$, and i represents the total number of the repetition period(s) of the download control channel for the user equipment.

Specifically, the information related to the delay(s) further comprises duration of a pre-determined portion of the first one of the delay(s), and wherein said determining is not initiated until the end of the pre-determined portion of the first one of the delay(s).

The above method further comprises after said receiving the one or more repetition period(s) of the downlink control channel, receiving from the base station, by the user equipment, downlink shared channel scheduled; wherein the random access channel carries preamble messages, and the downlink shared channel carries random access response messages or contention resolution messages.

One embodiment of the present application provides a user equipment configured to perform any of the methods above.

By employing the method and apparatus described herein help UEs to avoid blind decoding, therefore help to save time, system resource. Providing multiple repetition periods of the PDCCH allows eNB more flexibility in scheduling. Sending the multiple repetition periods of PDCCH followed by sending repetitive PDSCH helps UEs to possibly reduce the number of repetition periods of the PDCCH.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied. It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Figure 1:
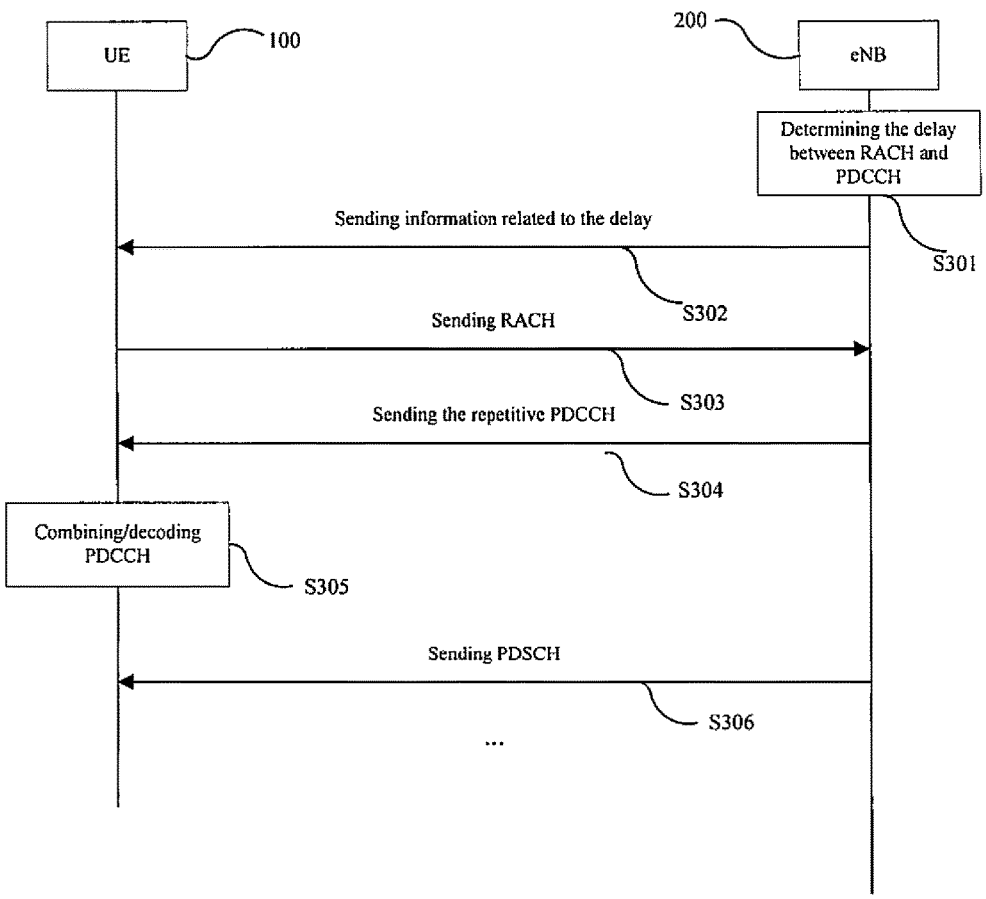
FIG. 1 shows a flowchart of a method for determining the delay between RACH and PDCCH according to one embodiment of the present application.
Figure 2:
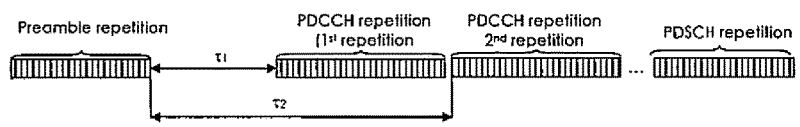
FIG. 2 shows an exemplary timeline of a random access procedure according to one embodiment of the present application.

FIG. 1 shows a flowchart of a method for determining the delay between RACH and PDCCH according to one embodiment of the present application, wherein UE 100 is within the coverage of an eNB 200. FIG. 2 shows a timeline of a random access procedure according to one embodiment of the present application.

In S301, eNB 200 may determine the delay between the RACH and the PDCCH. In one embodiment, the delay may be determined as a function of $R_1$ and/or a repetitive level $R_2$ of the PDCCH.

In various embodiments, multiple repetition periods of PDCCH may be adopted for communication with each individual UE. The number of repetition periods of PDCCH with respect to each UE may be configurable to provide flexibility for eNB 200 to schedule its resource. The repetition periods for various UEs may be transmitted in an interweaved manner which means the repetition periods for the same UE may be separated by repetition periods for other UEs.

In one embodiment, eNB 200 may determine delay $\tau_1$ between the end of the RACH and start of the first repetition period of the PDCCH for UE 100, and may determine $\tau_2$ between the end of the RACH and start of the a first repetition period of the PDCCH for another UE. In one embodiment, $\tau_1$, $\tau_2$ and other delays may be determined depending at least on the repetitive level $R_1$ of the RACH.

In an alternative embodiment, eNB 200 may determine $\tau_1$ and one or more gaps between the multiple repetition periods of the PDCCH for UE 100. Unit of the gap may be one radio frame or one sub-frame.

Also, there may be no overlap between repetition periods of PDCCH for various UEs, for example, $\tau_2$-$\tau_1$ should be no smaller than a repetition level $R_2$ of the first repetition period of the PDCCH.

In one embodiment, $R_2$ may be in direct proportion to $R_1$. For the same UE, the multiple repetition periods may have a single repetition level $R_2$, or may have different repetition levels determined by the scheduler in eNB 200. For various UEs, the repetition levels may be different due to various locations of the UEs. Therefore, the repetition level $R_2$ may be a UE specific value.

In S302, eNB 200 may send information related to the delay to UE 100. In one embodiment, the information related to the delay may comprise duration of $\tau_1$, $\tau_2$ and so forth. In an alternative embodiment, the information related to the delay may comprise the duration of $\tau_1$ and the duration of the gaps between the repetitive periods of the PDCCH for UE 100.

In one embodiment, the information related to the delay may also comprise the number of repetition periods of the PDCCH to be transmitted to UE 100.

In one embodiment, the information related to the delay may be transmitted in broadcast or dedicated signaling transmission prior to the random access procedure.

In S303, UE 100 may send random access channel (RACH) which carries preamble messages to eNB 200. The random access channel may be transmitted in a repetitive form with a repetitive level $R_1$.

In S304, eNB 200 may send the PDCCH to UE 100 with each of the repetition periods transmitted according to the delay determined in S301 in a repetitive form. For example, the first repetition period of the PDCCH for UE 100 may be sent after $\tau_1$ since the end of RACH.

Then in S305, UE 100 may decode and/or combine the PDCCH received. Since the delay between RACH and the repetition periods of the PDCCH are directly disclosed to UE 100, UE 100 may target for example the start of the first repetition period of the PDCCH after $\tau_1$ elapses. Because UE 100 is also informed about the number of the repetition periods of the PDCCH transmitted, if UE 100 fails to successfully receive the first repetition period, UE 100 may continue to receive the second or other repetition periods in order to correctly decode the PDCCH, and may stop receiving the PDCCH when the total number of the repetition periods of the PDCCH for UE 100 is reached. In one embodiment, UE 100 may send feedback information about if UE 100 has correctly decoded the PDCCH in Message 3 transmission.

In S306, eNB 200 may send physical downlink shared channel (PDSCH) to eNB 200. In one embodiment, PDSCH may also be transmitted in a repetitive form. PDSCH may carry RAR messages or contention resolution messages depending on various stages of the random access procedure.

Figure 3:
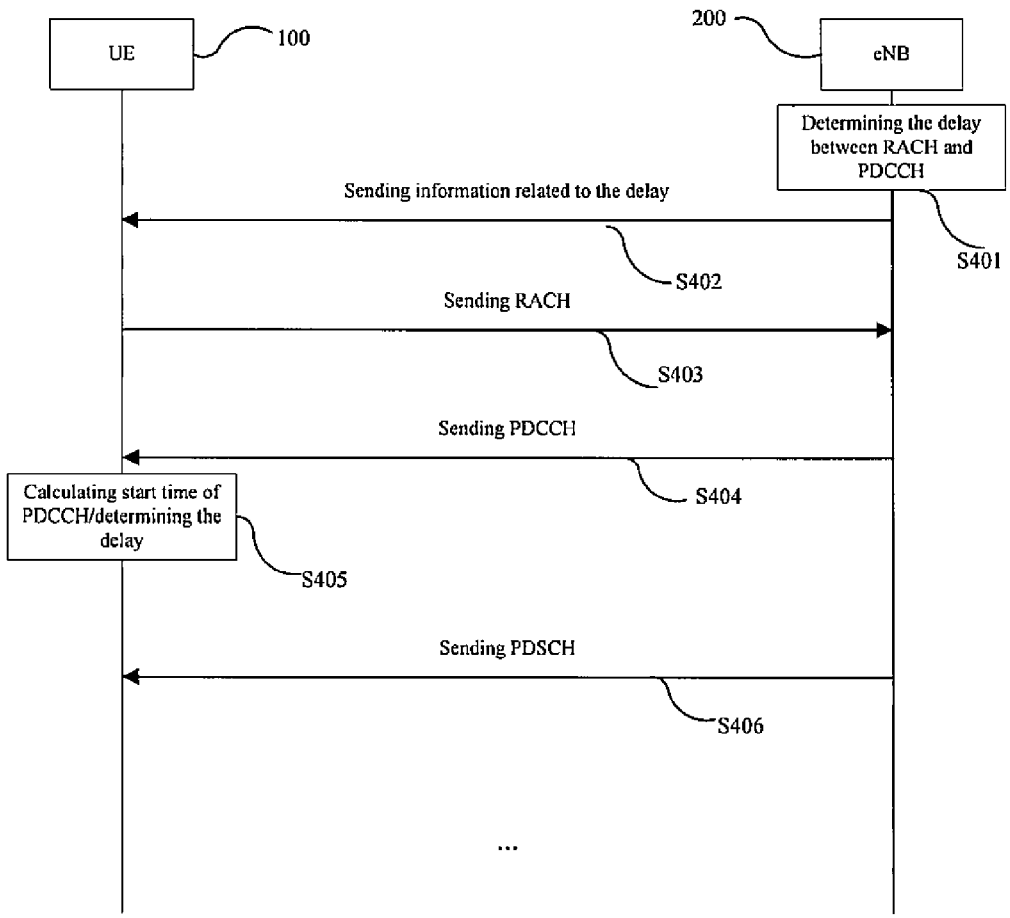
FIG. 3 shows a flowchart of another method for determining the delay between RACH and PDCCH according to another embodiment of the present application.
Figure 4:
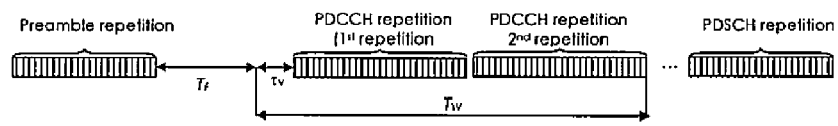
FIG. 4 shows an exemplary timeline of a random access procedure according to another embodiment of the present application.

FIG. 3 shows another method for determining the delay between RACH and PDCCH according to another embodiment of the present application. FIG. 4 shows a timeline of another exemplary random access procedure in accordance with another embodiment of the present application.

In S401, eNB 200 may determine the delay between RACH and one or more repetition periods of the PDCCH for UE 100, for example in a way similar to S301 in FIG. 1.

In S402, eNB 200 may send information related to the delay to UE 100 prior to the random access procedure, transmitted in broadcast or dedicated signaling. In one embodiment, the information related to the delay may at least comprise the repetitive level $R_2$ of the PDCCH which may be in direct proportion to $R_1$; sub-frame numbers of sub-frames starting the repetition periods of the PDCCH; and offset values related to the sub-frame numbers.

In another embodiment, the information related to the delay may only comprise $R_2$, the sub-frame number of the sub-frame which starts the first repetition period of the PDCCH for UE 100, offset values related to the sub-frame number of the first repetition period, and the gaps between repetitive periods of the PDCCH for UE 100.

In another embodiment, the information related to the delay may further comprise duration of $T_F$ which starts since the end of RACH, and instructions to UE 100 to begin determining the start of the first repetition period of the PDCCH at the end of $T_F$.

In one embodiment, the information related to the delay may also comprise the number of repetition periods of the PDCCH to be transmitted to UE 100.

In S403, UE 100 may send random access channel (RACH) which carries preamble messages to eNB 200. The random access channel may be transmitted in a repetitive form with a repetitive level $R_1$.

In S404, eNB 200 may send the one or more repetition periods of PDCCH to UE 100 transmitted according to the delay determined in S401.

In S405, UE 100 may calculate start of the repetition periods of PDCCH based on the information received. In one embodiment, UE 100 may use the following equation (1) for calculation.

$$(10*SFN_i+n_i+k_{1i})MOD(R+k_{2i})=0 \qquad (1)$$

where R represents the repetition level of the PDCCH which means the number of repetition within a single repetition period, $SFN_i$ represents a system frame number of a system frame that starts the ith repetition period of the PDCCH; $n_i$, which ranges from 0 to 9, represents a sub-frame number of a sub-frame that starts the ith repetition period of the PDCCH, $k_{1i}$ and $k_{2i}$ represent offsets related to $n_i$; i ranges from 1 to the total number of repetition periods of the PDCCH for UE 100. Mod function is used herein to calculate the start of the repetition periods of the PDCCH. However, other applicable mathematic functions may also be adopted using such factors mentioned above without deviating the scope of the present application.

In a further embodiment, UE 100 may not start to calculate start of the first repetition period of the PDCCH using equation (1) until the end of $T_F$. Then, since the end of $T_F$, equation (1) is not satisfied until $\tau_v$ has elapsed, which means the delay between the end of RACH and the first repetition period of PDCCH is $T_F+\tau_v$.

In S406, eNB 200 may send physical downlink shared channel (PDSCH) to eNB 200. In one embodiment, PDSCH may also be transmitted in a repetitive form. PDSCH may carry RAR messages or contention resolution messages depending on various stages of the random access procedure.

Figure 5:
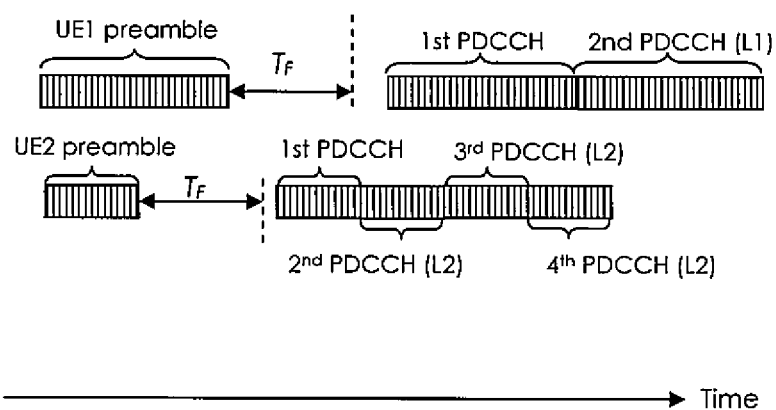
FIG. 5 shows a comparison between timelines of two random access procesures with different repetition levels according to one embodiment of the present application.

FIG. 5 shows a comparison between timelines of two random access procedures. In one embodiment, the PDCCH in the random access procedure of UE1 may have a repetition level L1, and the PDCCH in the random access procedure of UE 2 may have a repetition level L2. Even though UE1 and UE2 may have different repetition levels, UE1 and UE2 may both wait for $T_F$ after the end of RACH and then start to calculate the start of the first repetition period of PDCCH respectively, which allows sufficient time for eNB to schedule for the PDCCH after decoding the preamble messages from UEs.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method comprising:
    determining, by a base station, one or more delays between a random access channel and one or more repeated transmissions of a downlink control channel for a user equipment, depending at least on a repetition level of the random access channel and/or a repetition level of the downlink control channel;
    sending to the user equipment, by the base station, information related to the determined one or more delays;
    receiving from the user equipment, by the base station, the random access channel transmitted in a repetitive form; and
    sending to the user equipment, by the base station, the one or more repeated transmissions of the downlink control channel, wherein each of the one or more repeated transmissions is transmitted according to a corresponding one of the one or more delays in a repetitive form.

2. The method according to claim 1, wherein the information related to the determined one or more delays comprises duration of the one or more delays determined as a function of the repetition level of the random access channel, or duration of a first one of the determined one or more delays between the random access channel and a first one of the one or more repeated transmissions of the downlink control channel, duration of one or more gaps between the one or more repeated transmissions of the downlink control channel, and a total number of the one or more repeated transmissions of the downlink control channel for the user equipment.

3. The method according to claim 1, wherein the information related to the determined one or more delays at least comprises one or more sub-frame numbers of one or more sub-frames starting the one or more repeated transmissions of the downlink control channel, and one or more offset values related to the sub-frame numbers, and the repetition level of the downlink control channel; or
    the information related to the determined one or more delays at least comprises a first sub-frame number of a sub-frame starting the first repeated transmission of the downlink control channel, offsets related to the first sub-frame number, and the duration of the one or more gaps between the repeated transmissions of the downlink control channel; and
    the information related to the determined one or more delays also comprises a total number of the one or more repeated transmissions of the downlink control channel for the user equipment.

4. The method according to claim 3, wherein the information related to the determined one or more delays further comprises duration of a pre-determined portion of the first one of the determined one or more delays and instructions to the user equipment to initiate determining of a start of the first repeated transmission of the downlink control channel at an end of the pre-determined portion of the first one of the determined one or more delays.

5. The method according to claim 1, wherein the information related to one or more determined delays is sent in broadcast or other dedicated signaling transmission prior to said sending of the random access channel.

6. The method according to claim 1, further comprising after said sending of the one or more repeated transmissions of the downlink control channel, sending to the user equipment, by the base station, downlink shared channel.

7. The method according to claim 6, wherein the random access channel carries preamble messages, and the downlink shared channel carries random access response messages or contention resolution messages.

8. A method comprising:
    receiving from a base station, by a user equipment, information related to one or more delays between a random access channel and one or more repeated transmissions of a downlink control channel for the user equipment;
    sending to the base station, by the user equipment, the random access channel transmitted in a repetitive form;
    receiving from the base station, by the user equipment, the one or more repeated transmissions of the downlink control channel, wherein each of the one or more repeated transmissions of the downlink control channel is transmitted according to a corresponding one of the delay(s) in a repetitive form.

9. The method according to claim 8, wherein the information related to the one or more delays comprises duration of the delays determined as a function of a repetition level of the random access channel, or duration of a first one of the one or more delays between the random access channel and a first one of the one or more repeated transmissions of the downlink control channel as well as duration of one or more gaps between the one or more repeated transmissions of the downlink control channel, and a total number of the one or more repeated transmissions of the downlink control channel for the user equipment.

10. The method according to claim 8, wherein the information related to the one or more delays at least comprises one or more sub-frame numbers of one or more sub-frames starting the one or more repeated transmissions of the downlink control channel, and one or more offset values related to the one or more sub-frame numbers, and a repetition level of the downlink control channel; or
    the information related to the one or more delays at least comprises a first sub-frame number of a sub-frame starting the first repeated transmission of the downlink control channel, offsets related to the first sub-frame number, and the duration of the one or more gaps between the one or more repeated transmissions of the downlink control channel; and
    the information related to the one or more delays also comprises a total number of the one or more repeated transmissions of the downlink control channel for the user equipment.

11. The method according to claim 10, wherein one or more starts of the one or more repeated transmissions of the downlink control channel are determined using $$(10*SFN_i + n_i + k_{1i}) \text{MOD}(R + k_{2i}) = 0$$

wherein $SFN_i$ represents a system frame number of an ith one of the repeated transmissions, and $n_i$ represents a sub-frame number of a starting sub-frame of the ith repeated transmission, R represents the repetition level of the downlink control channel, $k_{1i}$ and $k_{2i}$ represent offset values related to the sub-frame number $n_i$, and i ranges from 1 to the total number of the one or more repeated transmissions of the downlink control channel for the user equipment.

12. The method according to claim 10, wherein the information related to the one or more delays further comprises duration of a pre-determined portion of the first one of the one or more delays, and wherein said determining is not initiated until the end of the pre-determined portion of the first one of the one or more delays.

13. The method of claim 8, further comprising
after said receiving the one or more repeated transmissions of the downlink control channel, receiving from the base station, by the user equipment, downlink shared channel;
wherein the random access channel carries preamble messages, and the downlink shared channel carries random access response messages or contention resolution messages.

14. The method according to claim 8 further comprising:
determining, by the user equipment, the start of the repeated transmissions of the downlink control channel, based at least on the information related to the one or more delays.

15. A base station, wherein the base station comprises at least one processor configured to—
determine one or more delays between a random access channel and one or more repeated transmissions of a downlink control channel for a user equipment, depending at least on a repetition level of the random access channel and/or a repetition level of the downlink control channel,
send to the user equipment information related to one or more the determined one more delays,
receive from the user equipment the random access channel transmitted in a repetitive form, and
send to the user equipment the one or more repeated transmissions of the downlink control channel, wherein each of the one or more repeated transmissions is transmitted according to a corresponding one of the one or more delays in a repetitive form.

16. The base station of claim 15 further comprising at least one memory including computer program code, wherein the at least one processor is configured, with the at least one memory and the computer program code, to cause the base station to determine the delays, send the information, receive the random access channel and send the repeated transmissions.

17. User equipment, wherein the user equipment comprises at least one processor configured to—
receive from a base station information related to one or more delays between a random access channel and one or more repeated transmissions of a downlink control channel for the user equipment,
send to the base station the random access channel transmitted in a repetitive form,
receive from the base station the one or more repeated transmissions of the downlink control channel, wherein each of the one or more repeated transmissions of the downlink control channel is transmitted according to a corresponding one of the one or more delays in a repetitive form.

18. The user equipment according to claim 17 wherein the at least one processor is further configured to:
determine the start of the repeated transmissions of the downlink control channel based at least on the information related to the one or more delays.

19. The user equipment of claim 18 further comprising at least one memory including computer program code, wherein the at least one processor is configured, with the at least one memory and the computer program code, to cause the user equipment to receive the information, send the random access channel, receive the repeated transmissions and determine the start.

20. The user equipment of claim 17 further comprising at least one memory including computer program code, wherein the at least one processor is configured, with the at least one memory and the computer program code, to cause the user equipment to receive the information, send the random access channel and receive the repeated transmissions.

* * * * *